(12) United States Patent
Hawkes et al.

(10) Patent No.: US 8,369,673 B2
(45) Date of Patent: Feb. 5, 2013

(54) OCEAN DEPLOYABLE BIODEGRADABLE OPTICAL FIBER CABLE

(75) Inventors: Graham Hawkes, San Anselmo, CA (US); Glen Sussman, Pt. Richmond, CA (US); Charles S Chiau, Milpitas, CA (US)

(73) Assignee: Bluefin Robotics Corporation, Quincy, MA (US)

( * ) Notice: Subject to any disclaimer, the term of this patent is extended or adjusted under 35 U.S.C. 154(b) by 81 days.

(21) Appl. No.: 12/795,971

(22) Filed: Jun. 8, 2010

(65) Prior Publication Data

US 2011/0299819 A1    Dec. 8, 2011

(51) Int. Cl.
*G02B 6/02*   (2006.01)
(52) U.S. Cl. ......... 385/123; 385/126; 385/127; 385/128
(58) Field of Classification Search .......... None
See application file for complete search history.

(56) References Cited

U.S. PATENT DOCUMENTS

| | | | | |
|---|---|---|---|---|
| 2,700,228 A | * | 1/1955 | Fainman | 434/388 |
| 3,766,307 A | * | 10/1973 | Andrews, Jr. | 174/47 |
| 4,274,709 A | * | 6/1981 | Asai | 385/128 |
| 4,488,773 A | * | 12/1984 | Wagner | 385/12 |
| 4,763,981 A | * | 8/1988 | Wilkins | 385/101 |
| 7,382,541 B2 | * | 6/2008 | Inoue et al. | 359/652 |
| 7,822,306 B2 | * | 10/2010 | Shinoski et al. | 385/113 |
| 2009/0187240 A1 | * | 7/2009 | Clerc et al. | 623/1.17 |
| 2011/0222047 A1 | * | 9/2011 | Guetta et al. | 356/4.01 |

FOREIGN PATENT DOCUMENTS

| | | | |
|---|---|---|---|
| DE | 19712253 a1 | * | 1/1998 |
| JP | 07-104157 | * | 4/1995 |

\* cited by examiner

*Primary Examiner* — Uyen Chau N Le
*Assistant Examiner* — Chad Smith
(74) *Attorney, Agent, or Firm* — Dergosits & Noah LLP

(57) ABSTRACT

An optical fiber cable has a transparent core for transmitting optical data and a biodegradable protective covering. When placed in water, the protective covering dissolves in water after a few days. The raw remaining optical fiber cover is very thin, approximately 0.003 inches in diameter and very fragile. The optical core is easily broken into fine particles which becomes sand on the sea floor.

20 Claims, 6 Drawing Sheets

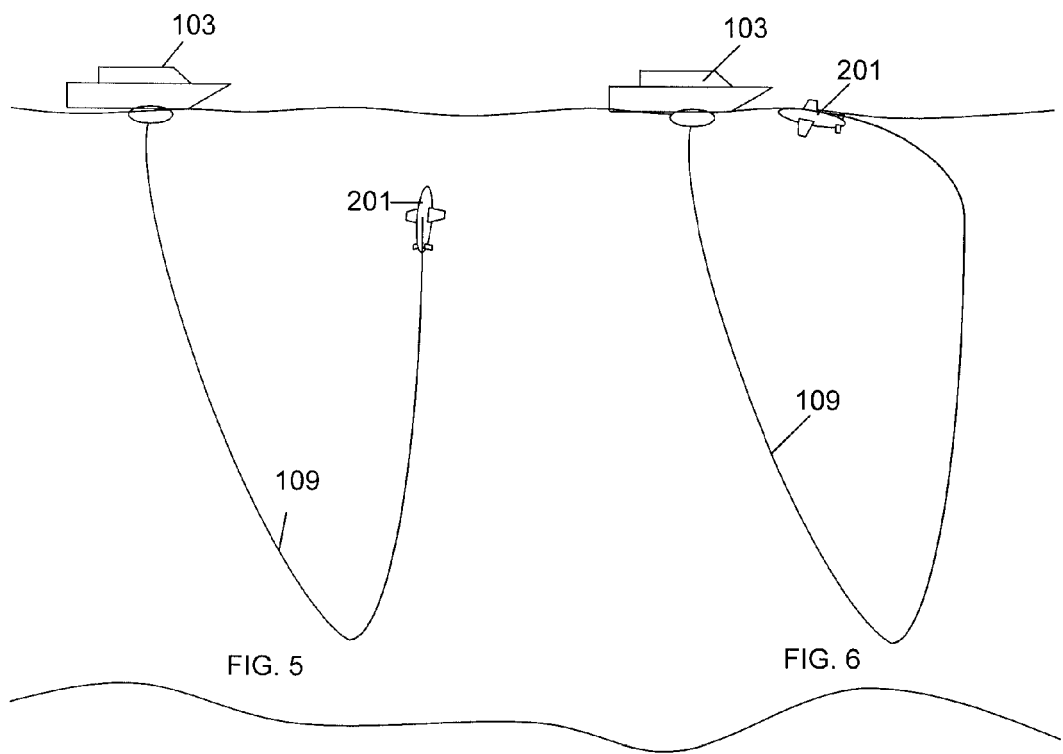

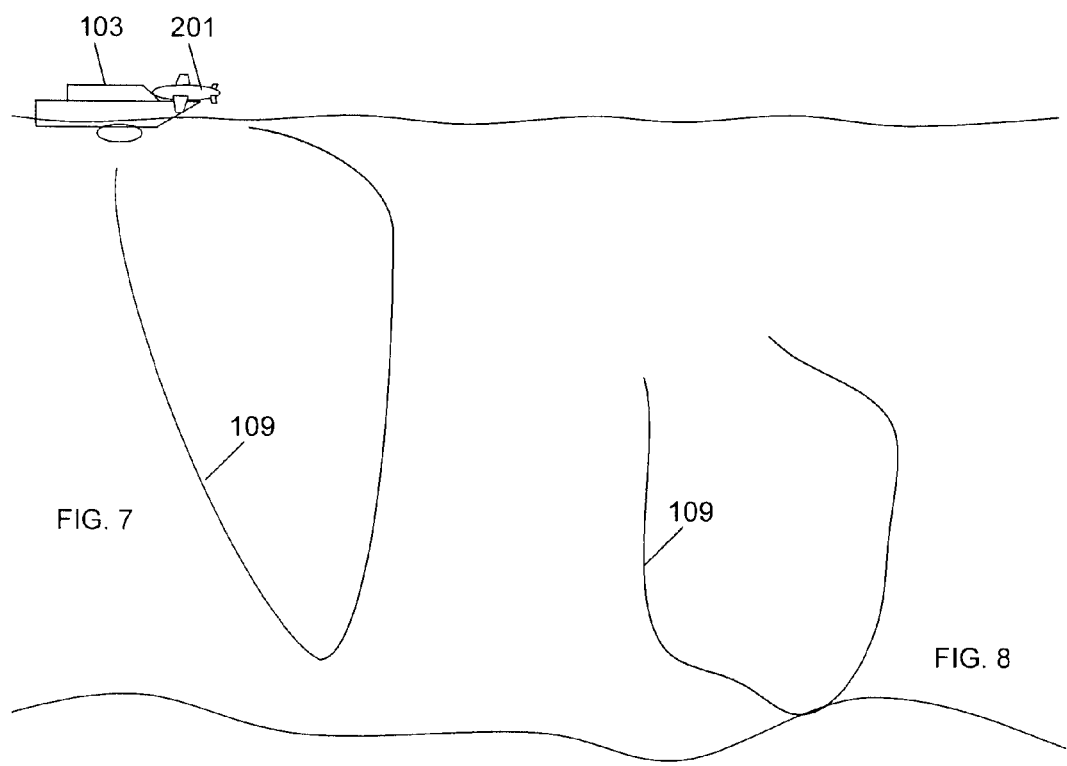

OCEAN DEPLOYABLE BIODEGRADABLE OPTICAL FIBER CABLE

FIELD OF INVENTION

The application is directed towards an optical fiber cable that can be used for underwater communication applications.

BACKGROUND

Optical fiber cables have been used in underwater applications to transmit and receive information. For example, an underwater device can have a propulsion system and a direction control mechanism. The underwater device can be deployed by a support ship and an optical fiber cable can be coupled between the underwater device and the support ship. The support ship can transmit control information to the underwater device that is used to operate the direction control mechanism. As the underwater device moves through the water, the optical cable remains in the water behind the underwater device. After the underwater vehicle has completed its mission, the vehicle can travel back to the support ship so that it can be retrieved. However, rather than retrieving the optical fiber cable, it is typically cut and left in the sea.

The optical fiber cable can then sink to the bottom of the sea and this waste can remain in the water indefinitely. In addition to polluting the water, the optical fiber cable can get tangled in other vessels travelling through the water and be a hazard to fish and marine life that contact the cable. In order to avoid this pollution, what is needed is an optical fiber cable that is biodegradable.

SUMMARY OF THE INVENTION

The present invention is directed towards an improved biodegradable optical fiber cable that can be used for underwater applications. The optical fiber includes a core which can be made of glass core and a protective coating that surrounds and protects the glass core. Although the optical fiber is left in the sea after use, the protective coating is made of a biodegradable material that dissolves in the water. The remaining core is then broken up into small pieces and becomes sand.

The majority of the optical fiber cable is made up of the protective coating. For example, if the core has an outer diameter of 0.003 inch and the protective coating has a diameter of 0.010 inch, the volume of the protective coating is about 10 times the volume of the core. Thus, by having a biodegradable coating, 90% of the optical fiber will disintegrate into the water. After the coating has dissolved, the remaining glass core is very fragile and is easily broken into small pieces without the protective coating. Much of the sea floor is sand and when the glass core is broken it becomes sand.

In addition to the environmental benefits, the inventive optical fiber can also have improved performance. In an embodiment, the optical fiber can be engineered to have a specific gravity that is substantially the same as the ambient water. The optical core can have a specific gravity of about 2.3-3.2 and preferably about 2.7 and the protective coating can have a specific gravity of about 0.5 to 0.99 and preferably about 0.89. Since the specific gravity is about the same as water, the optical cable will have a near neutral buoyancy which will cause the optical cable to be suspended or be nearly weight less in the water.

BRIEF DESCRIPTION OF THE DRAWINGS

FIGS. 2-8 illustrate a sequence of an ROV mission.

DETAILED DESCRIPTION

Figure 1:
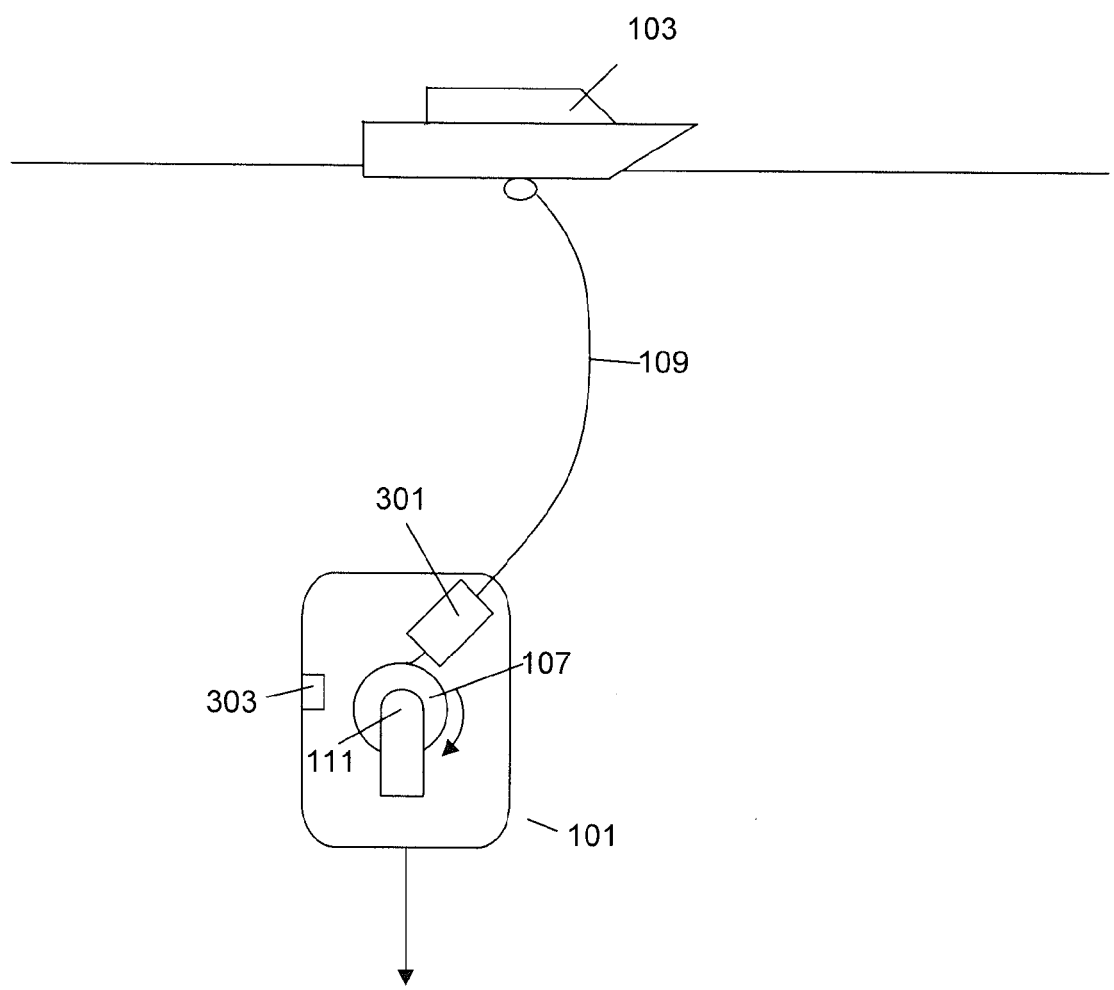
FIG. 1 illustrates an embodiment of an ROV in communication with a support ship through an optical fiber cable.

The present invention is directed towards a biodegradable optical fiber cable that also has improved functional performance. A first purpose of this invention is to be able to adjust the natural descent speed of fiber optic cable to allow for adequate usable deployment times. A second purpose is to limit all possible environmental impacts and to ensure that the fiber dissolves safely within the water environment.

In an embodiment, the fiber can be an optical fiber 109 that is stored on a spool 107 that is used for communications between a support ship 103 and a Remotely Operated Vehicle (ROV) 101. An end of the optical fiber 109 can be coupled to communications equipment on the support ship 103 and the other end of the optical fiber 109 can be coupled to communications and control equipment on the ROV 101.

The spool 107 of the optical fiber 109 is stored on the ROV 101. As the ROV 101 travels, the spool 107 can rotate which causes the optical fiber cable 109 to stream out of the ROV 101. The end of the optical fiber cable 109 can be coupled to a rotating coupling 111 so the spool 107 can rotate freely. In an embodiment, a sensor 115 can detect the relative velocity of the ROV 101 through the water and then control the rotational rate of the spool 107 to emit the optical fiber cable 109 at a rate that is substantially equal to or greater than the relative velocity of the ROV 101 through the water.

In an embodiment, a feeder mechanism 301 is used to remove the optical fiber cable 109 from the spool 107. The spool 107 can be mounted on an axle which allows the spool 107 to rotate. The feed mechanism 301 can be coupled to a velocity sensor 303 that detects the speed of the ROV 101 through the water. The feed mechanism 301 can remove the optical fiber cable 109 from the spool 107 at a rate that is equal to or greater than the velocity of the ROV 101. In order for the optical fiber cable 109 to be removed smoothly, the compressible cylindrical structure must maintain a constant tension on the optical fiber cable 109 regardless of the ambient pressure.

In order for the optical fiber cable 109 to be properly drawn from the spool 107, the optical fiber cable 109 must be wrapped around the spool 107 with a small amount of tension, for example, less than 1 pound of tension. If the optical fiber cable 109 is loose on the spool 107, it may become tangled as it is removed from the spool 107. This can result in damage or breakage of the optical fiber cable 109. The optical fiber cable 109 can have a tensile strength of about 10 pounds, however, it is very brittle and can be easily broken if bent. Thus, if the tangles to the optical fiber results in excessive tension or bending, the optical fiber cable 109 can very easily break resulting in a complete loss of control and communication between the ROV 101 and the support ship 103.

Figure 2:
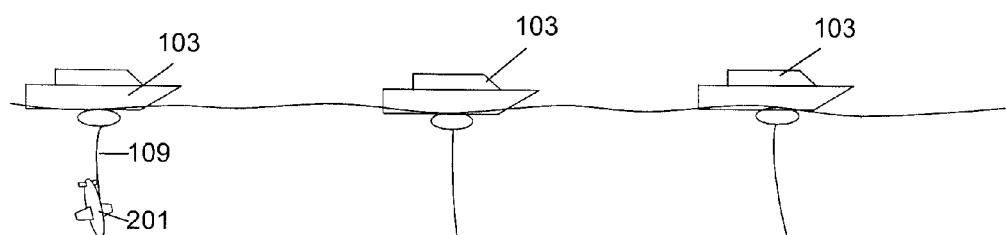
Figure 3:
Figure 4:

With reference to FIGS. 2-8 a sequence of an ROV mission are illustrated. In FIG. 2, the ROV is a winged ROV 201 that is in communication with a support ship 103 by an optical fiber cable 109. With reference to FIG. 3, as the ROV 201 descends, the optical fiber cable 109 extends from the ROV 201. With reference to FIG. 4, the ROV 201 approaches the sea floor. With reference to FIG. 5, the ROV 201 begins an ascent back to the surface. The optical fiber cable 109 remains in the water in the path that the ROV 201 has travelled. In FIG. 6, the ROV 201 surfaces and may travel towards the support ship 103. With reference to FIG. 7, the ROV 201 can be picked up by the support ship 103 and the optical fiber cable 109 can be separated from both the ROV 201 and the support ship 103.

With reference to FIG. 8, the optical fiber cable 109 sinks and eventually falls to the sea floor.

Figure 9:
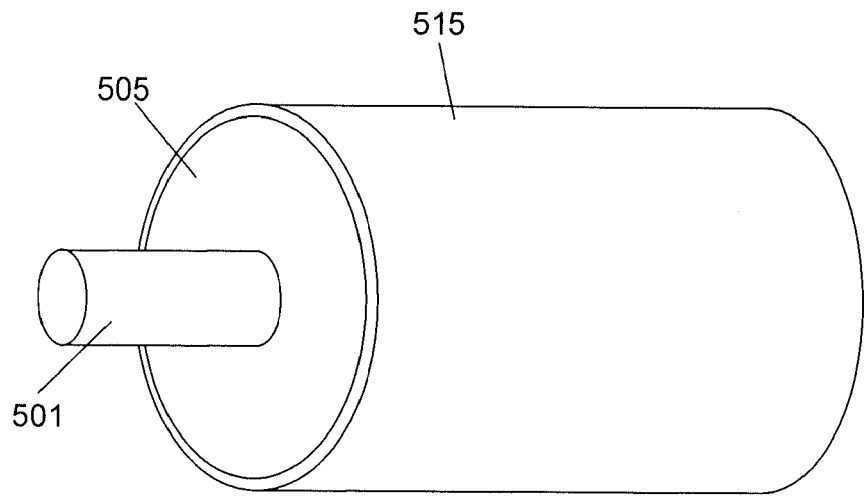
FIGS. 9-12 illustrate a sequence of biodegradation of the optical fiber cable.

With reference to FIG. 9, in an embodiment the optical fiber can include a core 501 that is an optical transmitter and a plastic coating 505. In an embodiment, an opaque layer can also be formed on the plastic coating 505. The core 501 may be about 2-400 µm in diameter. In a preferred embodiment, the core 501 can be about 10 µm in diameter. The core 501 can be made of an optically transparent material such as glass. However, in other embodiments, the core 501 can be made of other materials, such as fluoroziconate, fluoroaluminate and chalcogenide glasses as well as crystalline materials like sapphire. Silica and fluoride glasses usually have refractive indices of about 1.5, but some materials such as the chalcogenides can have indices as high as 3. In other embodiments, the core 501 can be made of plastic optical fibers (POF) that may have a core diameter of 0.5 millimeters or larger.

The core 501 can be surrounded by a plastic coating 505 that has an outer diameter of about 5-400 µm and in a preferred embodiment the diameter can be about 125 µm. In other embodiments, the core 501 can be in diameter and the coating 505 can have a diameter of about 50-500 µm. As discussed, the covering of optical fiber core 501 can be external soluble or biodegradable plastic coating specially engineered to meet the specific requirements of ocean deployment. The outer plastic coating 505 of raw optical fiber core 501 is changed to be a water-soluble plastic, for example a plastic containing corn starch, that would degrade in approximately say one month in sea water at close to zero degrees centigrade lying on the sea floor or slightly embedding into the sediment.

Another potential optical fiber coating 505 material is polyactic acid (PLA). PLA can be processed like most thermoplastics. Several forms of PLA exist including: poly-L-lactide (PLLA) and poly-D-lactide (PDLA) which form a highly regular stereocomplex with increased crystallinity. Biodegradation of PDLA and PLLA are slower than PLA due to the higher crystallinity.

The optical fiber coating 505 can be transparent or opaque. In some cases, light that is transmitted through the core 501 can also be emitted through a transparent optical fiber coating 505. This illumination may be in the infrared optical region and can cause the optical fiber coating 505 to be a potential target for animals and other light sensitive creatures that might bite or damage the cable. Also, for covert/defense applications having a cable that emits any light can result in detection by sensors. In order to eliminate this potential problem, the optical fiber coating 505 can be opaque. An additive can be added to make the coating 505 opaque. In other embodiments, an additional opaque layer 515 can be applied over the coating 505 to prevent all light from being emitted by the optical fiber coating 505. The opaque layer 515 can also be biodegradable and can dissolve in water like the coating 505.

Figure 10:
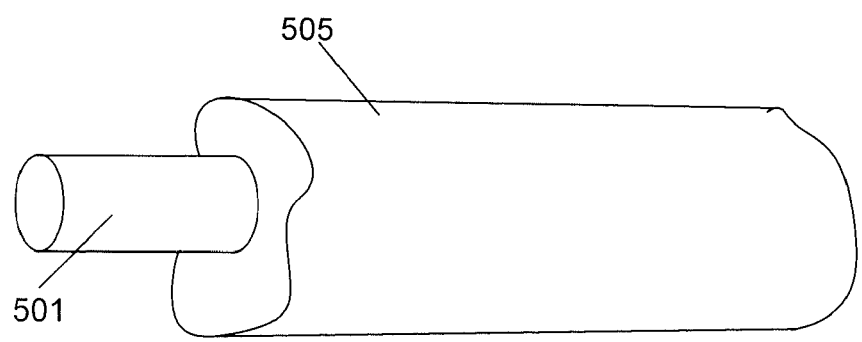
Figure 11:
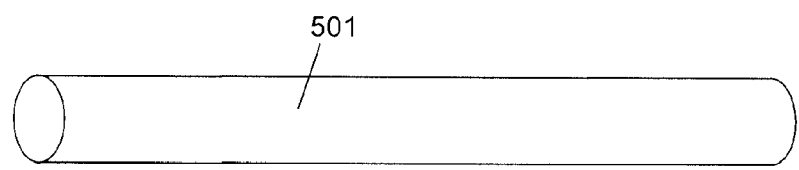
Figure 12:
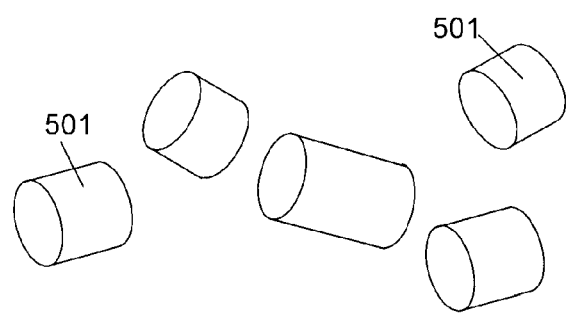

With reference to FIG. 10, as the optical fiber cable remains in the water, the coating 505 and possibly the opaque layer 505 dissolve in the water. With reference to FIG. 11, eventually only the core 501 material is left. The co-axial glass core 501 can be substantially the same as a normal optic fiber of a single mode optical fiber cable that does not have a biodegradable covering 505. Since the core 501 is typically only 0.003 inch diameter, it will be extremely fragile without the protective covering 505. With reference to FIG. 12, any bending or physical contact can cause the optical core 501 to mechanically break down in the sediment, essentially returning to "sand". Thus, the disposed fiber composed of its plastic coating and glass core, is quickly degradable and non-polluting.

Another feature of the present invention is the ability to control the buoyancy of the optical cable. In a preferred embodiment, the density of the complete optical fiber cable is close to but slightly greater than the density of seawater. This density will slow the descent and thus minimize the risk that the optical fiber cable will contact the bottom of the sea during the duration of the mission. Although a neutrally buoyant optical fiber cable would give unlimited operational time since the cable will effectively float in the ambient water without the fiber contacting the sea floor. However, because of environmental concerns, it is preferred that the density be slightly higher to ensure that the fiber will fall to the bottom in a timely manner for assimilation into the sediment and biodegradation. During the biodegradation process, the sea floor is also less harmful to sea life while the external coating 505 dissolves.

In another embodiment, the optical fiber cable can be designed to be neutrally buoyant for the duration of the mission but the plastic coating 505 can have a faster rate of biodegradation. For example, within 24 hours, the coating 505 can gain weight or lose volume so that after the useful life of the optical fiber cable is expended, the cable sinks and is quickly assimilated into the bottom sediments. This design further minimizes the potential for bottom contact, thus decreasing the risk of premature breakage of the optical fiber cable. In yet another embodiment, the optical fiber cable can initially have a positive buoyancy. When placed in water, the coating can absorb some of the ambient water and the weight in the water can be adjusted to be slightly negative or neutral as required by the application.

In order to change the buoyancy of the optical fiber cable, density of the coating can be changed or the relative diameters of the core and coating can be adjusted. In a preferred embodiment of this invention, the minimum changes are made to the production tooling for the fiber. Therefore, in the preferred case the glass single mode core 501 diameter and density is unchanged and remains standard. Further, the outside diameter of the plastic coating 505 is also unchanged to enable the use of standard production tooling, and the desired results are obtained only by altering the density of the outer protective soluble plastic layer.

By knowing the density and diameter of the core and the outer diameter of the coating, the required density of the coating can be determined and a suitable material can be used to fabricate the optical fiber cable. For example, an ultra light plastic such as ultra high molecular weight (UHMW) polyethylene with specific gravity 0.89 for the coating using standard production tooling will produce a fiber optic fiber that is very close to neutral buoyancy in seawater. Further, the ultra light plastic coating can be doped with a soluble component such as corn starch to further promote the solubility in water.

As a practical matter, ideal perfect neutral buoyancy can never be achieved since the density of seawater itself is variable depending on temperature, salinity and depth. Thus, there can be variations in density even within a single body of water. Therefore, in a preferred embodiment, the optical fiber cable has as lightly negative buoyancy, biasing the result to environmental safety with the disposed fiber enmeshed in bottom sediment. Therefore, the preferred embodiment will maintain existing standard fiber production diameters and the plastic coating will be designed with specific gravity slightly greater than 0.89, the preferred range being 0.9 to 0.94 after solubility modifications.

The following calculations are for a near neutrally-buoyant optical fiber cable. For single mode fiber, the glass inner and outer coaxial glass cores together may be standardized at approximately a 0.003 inch outside diameter. Therefore, volume of glass per 1,000 feet unit length is $\pi \times (Radius)^2 \times length$ or $\pi \times (0.003 \text{ inch}/2)^2 \times 12,000 \text{ inches} = 0.0848$ cubic inches. For buoyancy calculations the combined specific gravity of the two glasses (they have different refractive index and slightly different specific gravities) comprising the light transmitting single mode core may be taken as 2.7. Thus, the weight per cubic inch of glass is approximately 0.097 lbs. and the weight of 1,000 feet of 0.003 inch diameter glass is about 0.0082 lbs.

The volume of plastic per 1,000 feet of single mode fiber with standard outside diameter taken as 0.010 inch is $\pi \times (Radius)^2 \times length - volume$ of glass or $\pi \times (0.01 \text{ inch}/2)^2 \times 12,000 \text{ inches} - 0.0848$ cubic inches = 0.86 cubic inches. The weight of plastic in a standard optical fiber cable per 1,000 feet assuming a specific gravity of the plastic is 1.14 or 0.041 lbs per cubic inch is 0.035 lbs. Thus, a standard optical fiber cable both the glass core and the plastic covering have a specific gravity higher than that of sea water. The total weight of a standard fiber per 1,000 feet is 0.0082 lbs+0.035 lbs.=0.043 lbs. The displacement volume of fiber is $\pi \times (0.01/2)^2 \times 12,000$ cubic inches=0.94 cubic inches. The weight of the sea water displacement per 1,000 ft of standard is 0.94 cubic inch× 0.037 lbs/cubic inch=0.035 lbs. Sea water has a density of 0.037 lbs per cubic inch. Therefore, as a reference, the typical negative buoyancy of a standard single mode fiber is the weight of the standard optical cable−the weight of water which is 0.043 lbs−0.035 lbs=0.008 lbs per 1,000 ft.

In a preferred embodiment, the fiber production tooling may be relatively unchanged but the plastic coating material is substituted for one having a specific gravity close to UHMW Polyethylene for example (s.g.=0.89, 0.032 lbs per cu in). It can be seen that weight of the plastic per 1,000 ft of fiber is reduced to 0.027 lbs per 1,000 ft and the total weight of fiber optic with standard glass core and standard outside diameter is 0.027 lbs of plastic+0.0082 lbs of glass=0.035 lbs weight per 1,000 ft of optical fiber cable.

Since the displacement of the optical fiber cable is also 0.035 lbs per 1,000 ft, this fiber would be very close to neutrally buoyant with a standard 0.01 inch outer diameter plastic light weight coating having a S.G. of 0.89. However, in a preferred embodiment, considering environmental impact is to have the fiber slightly negative so that over time the discarded fiber reaches the seabed safely but that the downward migration is slowed, minimizing fiber to seabed contact during the ROV mission which may typically last between 9 to 12 hours.

The above calculations assume that the existing optical fiber diameter and plastic cover diameter are used. In an alternative embodiment, the outer diameter of the fiber optic cable can be changed to achieve the desired results. From calculations above, the ideal specific gravity of the water soluble plastic coating around the glass core of ocean-deployable optical fiber is 0.9-0.95 with a standard outer diameter of 0.010 inches. This would lower the in-water weight from 0.008 lbs per 1,000 ft to approximately 0.0005-0.002 lbs per 1,000 ft which would reduce the theoretical downwards migration velocity using standard skin drag calculations by the square root of 10.

In other embodiments, it is possible to construct an optical fiber cable that has an outer diameter that is greater or smaller than 0.010 inch. Since the density of sea water is approximately 0.037 lb/in$^3$, the net density of the optical fiber cable should be slightly greater than 0.037 lb/in$^3$. A 5%-10% greater density can be between 0.039 lb/in$^3$ and 0.041 lb/in$^3$. Thus, an optical fiber cable having a plastic coating that has a much lower density can be thinner than 0.010 and a coating that has a higher density can have diameter that is larger than 0.010. Both optical fiber cables can have the same net density. The optical fiber cable density can be represented by the general density weight/volume equation where weight=density of the coating×volume+the core weight. By adjusting the outer diameter based upon the density of the coating material, the net density of the optical fiber cable can be adjusted to be greater than about 0.039 lb/in$^3$ and less than about 0.041 lb/in$^3$.

The lower density results in a lower downward velocity through the water due to gravity. In comparison to a standard optical fiber cable, there should be approximately three times more time for the optical fiber cable to contact the sea floor. However, due to other factors at such a small scale, standard drag calculations may be inaccurate. In-water experiments were performed on a standard optical fiber cable that was allowed to sink into the 8,000 ft deep Monterey canyon simulating a typical vehicle mission. The average survival time of standard fiber was three hours. After three hours, the optical fiber was terminated by sinking to the bottom and mechanically snagging an object on the sea floor causing optical fiber failure. Thus, from experimental results in the ocean, it is shown that slowing the downwards migration by a factor of three to four will result in an optical fiber cable survival times of at least 9 to 12 hours or more. The calculated downward migration velocity due to gravity, the velocity can be reduced by a factor of three by reducing the downward gravitational force or negative buoyancy by a factor of 10 achieved as described above.

It will be understood that the inventive system has been described with reference to particular embodiments, however additions, deletions and changes could be made to these embodiments without departing from the scope of the inventive system. Although the systems that have been described include various components, it is well understood that these components and the described configuration can be modified and rearranged in various other configurations.

What is claimed is:

1. An optical cable comprising:
    an optical fiber core; and
    a protective coating surrounding and in direct physical contact with the core, the protective coating having a specific gravity greater than 0.89 and less than 0.96;
    wherein the optical cable has a net density of greater than 0.039 lb/in$^3$ and less than 0.041 lb/in$^3$.

2. The optical cable of claim 1 wherein the core has a circular cross section and an outer diameter that is less than 0.01 inch.

3. The optical cable of claim 1 wherein the protective coating has an annular cross section and an outer diameter that is less than 0.020 inch.

4. The optical cable of claim 1 wherein the optical fiber core is made of glass having a specific gravity greater than 2.5 and less than 3.0.

5. The optical cable of claim 1 wherein the protective coating is opaque and blocks the emission of light traveling through the core.

6. The optical cable of claim 1 wherein the protective coating dissolves from the optical cable in less than one month after immersion into water.

7. The optical cable of claim 1 wherein the protective coating is a water soluble plastic material.

8. The optical cable of claim 7 wherein the water soluble plastic material includes corn starch.

9. The optical cable of claim 7 wherein the water soluble plastic material includes polyactic acid (PLA).

10. The optical cable of claim 7 wherein the water soluble plastic material includes poly-L-lactide (PLLA).

11. An optical fiber cable comprising: a core; and a biodegradable protective coating surrounding and in direct physical contact with the core, the protective coating having a specific gravity greater than 0.89 and less than 0.96; wherein the optical cable has a net density of greater than 0.039 lb/in$^3$ and less than 0.041 lb/in$^3$.

12. The optical cable of claim 11 wherein the core has a circular cross section and an outer diameter that is less than 0.01 inch.

13. The optical cable of claim 11 wherein the protective coating has an annular cross section and an outer diameter that is less than 0.020 inch.

14. The optical cable of claim 11 wherein the optical fiber core is made of a glass material having a specific gravity greater than 2.5 and less than 3.0.

15. The optical cable of claim 11 wherein the protective coating is opaque and blocks the emission of light traveling through the core.

16. The optical cable of claim 11 wherein the protective coating dissolves from the optical cable in less than one month after immersion into water.

17. The optical cable of claim 11 wherein the protective coating is a water soluble plastic material.

18. The optical cable of claim 17 wherein the water soluble plastic material includes corn starch.

19. The optical cable of claim 17 wherein the water soluble plastic material includes polyactic acid (PLA).

20. The optical cable of claim 17 wherein the water soluble plastic material includes poly-L-lactide (PLLA).

* * * * *